United States Patent [19]

McCloskey

[11] 3,960,416
[45] June 1, 1976

[54] SPHERICAL BEARING HAVING ADJUSTABLE KEY

[75] Inventor: Albert R. McCloskey, Fairfield, Conn.

[73] Assignee: Heim Universal Corporation, Fairfield, Conn.

[22] Filed: Jan. 20, 1975

[21] Appl. No.: 542,517

[52] U.S. Cl.................................... 308/72; 308/66; 308/68
[51] Int. Cl.²...................... F16C 9/06; F16C 11/06; F16C 23/04; F16C 25/04
[58] Field of Search........................ 308/72, 66, 68

[56] References Cited
UNITED STATES PATENTS

| | | | |
|---|---|---|---|
| 1,671,701 | 5/1928 | Coats | 308/72 |
| 3,365,249 | 1/1968 | McCloskey | 308/72 |
| 3,583,775 | 6/1971 | Potter | 308/72 |
| 3,589,779 | 6/1971 | Sokol | 308/72 |

Primary Examiner—Albert J. Makay
Assistant Examiner—Howard Beltran
Attorney, Agent, or Firm—James C. Wray

[57] ABSTRACT

A spherical bearing comprising an outer member having a hole extending from side to side, the surface of the hole being concave and spherical so that the outer member has constricted portions at each side, the outer member also having a ramped keyway extending diagonally downward from the hole; a ramped key in the keyway whose ramp is complementary with the ramp defining the keyway in the outer member, the key also having a concave and spherical top surface corresponding to the surface of the hole so that the key has shoulder portions corresponding to the constricted portions of the outer member; and a partially spherical inner member, the inner member being held in the outer member by impingement of the spherical surface of the inner member against the constricted portions of the outer member and the key being held in the outer member by impingement of the shoulder portions of the key against the spherical surface of the inner member, adjusting means to move the key upwardly or downwardly on the respective ramps of the key and the keyway thereby varying the bearing tolerance between the inner and outer member.

7 Claims, 7 Drawing Figures

SPHERICAL BEARING HAVING ADJUSTABLE KEY

BACKGROUND OF THE INVENTION

The present invention relates generally to self-aligning bearings having a ball-like inner member with a convex outer surface and an outer member having an inner surface with a complementary concave spherical inner face. These types of bearings, which are commonly called "spherical bearings," have been utilized in industry for a substantial period of time. The technological evolution of these type bearings has been directed more in the terms of material composition of its various component parts rather than toward basic changes in design concepts. Accordingly, the design advances in spherical bearings have not been substantial in nature and thereby presently limiting their applications.

One area in which the spherical bearings have been extensively applied is the aircraft industry. This is due to the spherical bearing self-aligning characteristic. A typical such application is marrying of a spherical bearing to a landing gear strut or member of an airplane. In this application the outer race is commonly press-fitted into a housing or the like rendering it difficult to remove and/or maintain. When any such maintenance is required, such as replacing of the ball, the entire bearing assembly including the inner and outer race member would have to be removed and replaced by an entirely new bearing assembly. Such an operation could entail substantial expense and downtime of the entire aircraft.

There are a number of prior art spherical bearings which have been addressed to this kind of problem. One such type prior art bearing is the "messerschmidt" bearing. A concept of this bearing is that the ball can be removed in the field without disassembling the entire bearing, that is, removing the outer race member from its mounting.

One may refer to my prior invention in this general field as embodied in U.S. Pat. No. 3,365,249, patented Jan. 23, 1968 and entitled "Spherical Bearing." This particular bearing may be disassembled in the field but may not be "adjusted" without the provision of new component parts. Such an adjustment may include the varying of the bearing tolerance between the two race (i.e., inner and outer) members which may change during operational usage. One may also refer to my more recent invention also in this field as embodied in U.S. Pat. application Ser. No. 530,697, filed Dec. 9, 1974, and entitled "Spherical Bearing With Slotted Key"; assigned Docket No. 2194. This invention contemplates a partial slot in the key which may be used to vary the bearing tolerances.

SUMMARY OF THE INVENTION

It is therefore, a primary object of the present invention comprising an outer member having a hole extending from side to side, the surface of the hole being concave and spherical so that the outer member has constricted portions at each side, the outer member also having a ramped keyway extending diagonally downward from the hole; a ramped key in the keyway whose ramp is complementary with the ramp defining the keyway in the outer member, the key also having a concave and spherical top surface corresponding to the surface of the hole so that the key has shoulder portions corresponding to the constricted portions of the outer member; and a partially spherical inner member, the inner member being held in the outer member by impingement of the spherical surface of the inner member against the constricted portions of the outer member and the key being held in the outer member by impingement of the shoulder portions of the key against the spherical surface of the inner member, adjusting means to move the key upwardly or downwardly on the respective ramps of the key and the keyway thereby varying the bearing tolerance between the inner and outer member.

It is another object of the present invention to provide a spherical bearing wherein said adjusting means includes an adjusting screw threaded into the key, the head of said screw shouldered in the outer member, the shank of the screw disposed in an elongated bore in the outer member.

It is still another object of the present invention to provide a spherical bearing wherein a resilient member is disposed between the key and the keyway at their respective ramps.

It is a further object of the present invention to provide a spherical bearing wherein the resilient member is a plastic sheet member being disposed between said key and keyway.

It is yet another object of the present invention to provide a spherical bearing wherein the elongated bore in the outer member has a longitudinal axis perpendicular to the axis of the hole in the outer member.

It is still another object of the present invention to provide each of a spherical bearing wherein the head of the screw is disposed in an elongated counter-bore which is in communication with the elongated bore.

Embodiments of the bearing according to the concept of the present invention are shown and/or described by way of example in the accompanying drawings and following description of the invention without attempting to show or describe all of various forms and modifications in which the invention might be embodied; the invention being measured by the appended claims and not by the details of the specification.

BRIEF DESCRIPTION OF THE DRAWINGS

FIG. 3 is a sectional view of the spherical bearing of FIG. 4 taken along line 3—3;

DESCRIPTION OF THE INVENTION

A spherical bearing embodying the concept of the present invention is generally indicated, as appropriate, by number 10 on the attached drawing as set forth in FIGS. 1 through 4, inclusive.

The bearing 10 shown is of the rod end spherical bearing variety, however, the present invention is also applicable to spherical bearings as well.

Figure 1:
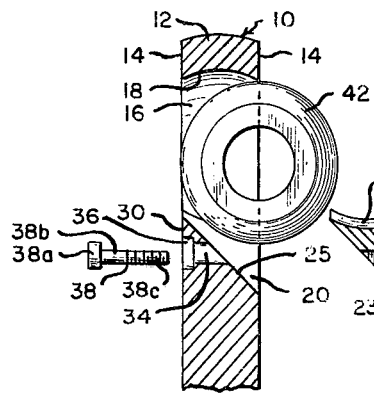
FIG. 1 is a partial section view of a spherical bearing assembly in accordance with the present invention in a disassembled state showing the outer member in section with the ramped key in section removed with the inner member being inserted into the outer member.
Figure 2:
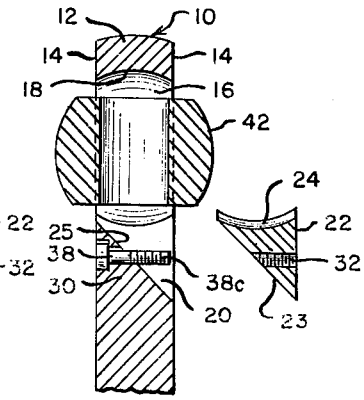
FIG. 2 is a spherical bearing assembly of FIG. 1 showing the outer member and the inner member is section after the inner member has been inserted and rotated to make room for the insertion of the ramped key and it also shows the key in the process of being inserted and the screw inserted in the elongated bore.
Figure 3:
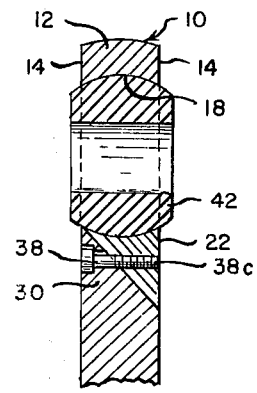
FIG. 3 is the spherical bearing of FIG. 1 in section and in its assembled state showing all parts in their final position.
Figure 4:
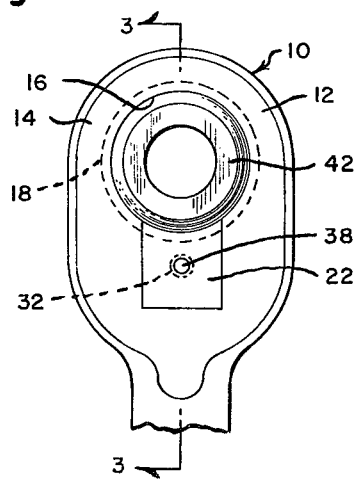
FIG. 4 is a side elevational view, viewed from the key side, of the assembled spherical bearing of FIG. 3, that is

FIGS. 1 through 4 show the bearing 10 in various stages of assembly. In particular FIG. 4 shows an outer member 12 with substantially flat sides 14. The outer member 12 is also provided with a substantially cylindrical hole 16 formed therethrough as by machining or drilling or the like.

The cylindrical hole or bore 16 is further formed to provide a concave inner surface 18 which serves as the outer race. There is also formed in the outer member 12 a ramped keyway 20 which may be shaped in various ways. For example, it can be formed in a rectangular shape as shown in FIG. 4 to accommodate for registration therein a rectangularly shaped key 22. The key 22 is provided with a ramp 23 which is complementary with the ramp 25 of the keyway 20.

The ramped keyway 20 extends diagonally through the outer member 12 in a generally axial direction. It can be seen that the rectangular key 22 has formed on a part of its outer surface not embraced by the keyway 20 a concave surface 24 which is continuous with the concave inner surface 18 formed on the inner surface of the bore 16 of the outer member 12.

It should be noted that the concave surfaces (18 and 24) of both the outer member 12 and the key 22 respectively can be formed in one machine operation with the key 22 in place in the keyway 20.

The major point of novelty is to be found in the particular configuration of the key 22 and in particular to the provision of the before mentioned ramp 23 which is complementary to the ramp 25 of the keyway 20. The provision of the two complementary ramps 23 and 25 allow for the relative movement of the key 22 with respect to the outer member 12 and the inner member 42 in a manner to be later described, this relative movement will vary the bearing tolerance between the inner member 42 and outer member 12. It can be seen, and particularly in FIGS. 1 through 3, that the ramp 25 on the keyway defines a triangular wall 30 formed in the outer member 12. The triangular wall 30 is provided with an elongated bore 34 which is in communication with an elongated counter-bore 36.

The key 22 is provided with a threaded bore 32 which is in general communication with the elongated bore 34 when the key 22 is in its assembled state (as shown in FIG. 3). The bearing 10 is further provided with an adjusting screw 38 having a head 38a and an unthreaded shank 38b and a threaded portion 38c. The elongated bore 34 and the elongated counterbore 36 is adapted to receive the threaded adjusting screw 38 and the threaded portion 38c of the adjusting screw 38 is adapted to be intermeshed with the threaded bore 32.

To assemble the bearing 10, the inner member 42 is inserted within the bore 16 of the outer member 12 without the key 22 in place. As can be seen, the inner member 42 is similarly accommodated by the keyway 20. Referring now to FIG. 2, the inner member 42 is rotated to permit insertion of the ramped rectangular key 22. The key 22 is then held in place by the threading of the threaded adjusting screw in meshing relationship with the threaded bore 32 of the key. As shown in FIG. 3, the key 22 has been inserted in its final position and the inner member 42 has been rotated to its operational position. It can be seen therefore that the inner member 42 is held in its operational position within the outer member 12 by the impingement of the convex spherical surface 44 against the constricted portions of the bore 16 as defined by the termini of the concave surfaces 18 and 24 of the outer member 12 and the key 22, respectively.

It should be noted that the bearing 10 can be assembled in an alternative fashion as follows; the key 22 which is essentially segmented can be assembled after insertion of the inner member 42. This is, the inner member could be placed in its operational position within the bore 16 and thereupon the key including the two outer portions and the resilient members 27 in place could be assembled and fixed in position by the insertion and threading of the screw 28 into the threaded bore 32 of the key.

Figure 5:
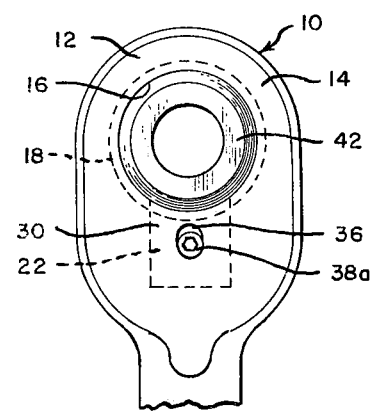
FIG. 5 is a side elevational view, viewed from the screw head side of the bearing of FIG. 3.
Figure 6:
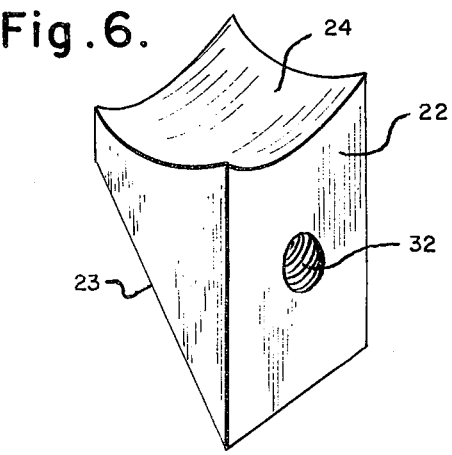
FIG. 6 is an enlarged isometric view of the ramped key as used in FIGS. 1 through 5.

At this point, the spherical bearing 10 of FIGS. 3, 4 and 5 is in an assembled operational state. As before mentioned, the key is provided with a ramp 23 which is complementary to the ramp 25 of the keyway 20. The provision of these two complementary ramps 23 and 25 allow for the relative movement of the key 20 with respect to the outer member 12 and the inner member 42. That is, the ramps act as a co-acting bearing surface for the key 22 with respect to the keyway 20. The elongated bore 34 and the elongated counterbore 36 are elongated such that their longitudinal axes are generally perpendicular to the axis of the cylindrical bore 16 of the outer member. It can be seen, therefore, that the key 22 can be driven upwardly or downwardly and the distance travelled by the key would be accommodated by the elongated bore 34 and elongated counterbore 36. In fact, as the threaded adjusting screw 38 is further threaded into the threaded bore 32 of the key the action of the head 38a within the counter-bore 36 will tend to drive the key 22 in a slightly upward direction. Accordingly, the bearing tolerance between the inner member 42 and the outer member 12 at their respective bearing surfaces can be adjusted by the threading action of the threaded adjusting screw 38 with respect to the threaded bore 32.

These important features are a substantial advance over the prior art and facilitates "in the field" adjustments of the various component parts of the bearing 10 while they are in place. Therefore, operational wear and the like can be compensated by the above-noted adjustment without causing any down time of the apparatus with which the bearing 10 is associated.

Figure 7:
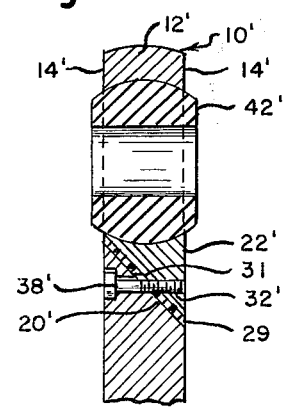
FIG. 7 is a sectional view of another form of the present invention in which the resilient material is disposed between the key and the keyway at their respective ramps.

Referring now to the bearing of FIG. 7, the various component parts have been denoted by the same numbers as those used in describing the bearing 10 of FIGS. 1 through 6 (except as noted). However, each number has a "prime" affixed to it. The above description of bearing 10 is generally applicable to the bearing 10' except that a resilient member 29 has been disposed between the key 22' and the keyway 20'. As can be seen in FIG. 7, resilient member 29 is in the form of a plastic sheet. The plastic sheet 29 is also provided with an elongated slot 31 to accommodate the movement of key 22' with respect to the keyway 20'. The provision of the resilient member 29 will effect a degree of "float" for the key 22' with respect to the key, that is, operational loading transmitted to the key 22' will be cushioned by the resilient member 29. This cushioning affect can be varied by the degree of compression or preloading exerted on the resilient member 29. Obviously, the degree of compression and preloading force will increase as the adjusting screw 38' is further threaded into the threaded bore 32'. Similarly, there may be certain situations in which it may be desirous to provide a resilient member 29 from a laminent structure to effect certain desired preloading properties.

From the above description of the invention along with various figures as set forth in the drawings it will be readily seen and appreciated that a spherical bearing embodying the concept of the present invention will positively and effectively accomplish the objectives of the invention. The above-noted embodiment is shown by way of example without attempting to show all the various forms and modifications in which the invention might be embodied; the invention being measured by the appended claims and not the specific details of the specification.

What is claimed is:

1. A spherical bearing comprising an outer member having a hole extending from side to side, the surface of the hole being concave and spherical so that the outer member has constricted portions at each side, said outer member also having a ramped keyway extending diagonally downward from said hole; a ramped removable key in said keyway whose ramp is complementary with the ramp defining said keyway in said outer member, said key also having a concave and spherical top surface corresponding to the surface of said hole so that said key has shoulder portions corresponding to the constricted portions of said outer member; and a partially spherical inner member, said inner member being held in said outer member by impingement of said spherical surface of said inner member against the constricted portions of said outer member and said key being held in said outer member by impingement of the shoulder portions of said key against said spherical surface of said inner member, adjusting and securing means to move said key along the respective ramps of said key and said keyway varying the bearing tolerance between said inner and outer member and to secure said key to said outer member.

2. A spherical bearing assembly in accordance with claim 1 wherein the adjusting and securing means includes an adjusting and securing screw threaded into the key, the head of said screw shouldered in the outer member, the shank of said screw disposed in an elongated bore in the outer member.

3. A spherical bearing assembly in accordance with claim 2 wherein said elongated bore in said outer member has a longitudinal axis substantially perpendicular to the axis of the hole in the outer member.

4. A spherical bearing assembly in accordance with claim 3 wherein said head of said screw is disposed in an elongated counter-bore which is in communication with said elongated bore.

5. A spherical bearing assembly in accordance with claim 1 wherein a resilient member is disposed between the key and the keyway at their respective ramps.

6. A spherical bearing assembly in accordance with claim 5 wherein the resilient member is a plastic member disposed between said key and said keyway.

7. A spherical bearing assembly in accordance with claim 1 wherein the adjusting and securing means includes an adjusting and securing screw threaded into the key, the head of said screw shouldered in the outer member, the shank of said screw disposed in an oversized bore in the outer member.

* * * * *